United States Patent
Akahane

(10) Patent No.: US 7,791,773 B2
(45) Date of Patent: Sep. 7, 2010

(54) IMAGE SCANNING APPARATUS AND METHOD OF CONTROLLING THE SAME

(75) Inventor: Hisayuki Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 590 days.

(21) Appl. No.: 11/854,356

(22) Filed: Sep. 12, 2007

(65) Prior Publication Data
US 2008/0068676 A1   Mar. 20, 2008

(30) Foreign Application Priority Data
Sep. 14, 2006   (JP) ............................ 2006-249411

(51) Int. Cl.
*H04N 1/04* (2006.01)
(52) U.S. Cl. .................. 358/475; 358/474; 358/497
(58) Field of Classification Search ................ 358/475, 358/497, 406, 474, 509, 504; 399/211, 212, 399/220, 11; 250/234, 239; 356/218, 229; 355/68
See application file for complete search history.

(56) References Cited

U.S. PATENT DOCUMENTS

| | | | | |
|---|---|---|---|---|
| 4,837,450 | A * | 6/1989 | Satomura et al. | 250/559.02 |
| 4,952,972 | A * | 8/1990 | Someya | 355/68 |
| 5,495,329 | A * | 2/1996 | Anderson et al. | 356/218 |
| 6,891,647 | B2 * | 5/2005 | Konno | 358/497 |
| 7,099,052 | B2 * | 8/2006 | Chang et al. | 358/474 |
| 7,440,144 | B2 * | 10/2008 | Yamaguchi | 358/406 |
| 2004/0105130 | A1 * | 6/2004 | Lien | 358/406 |
| 2005/0206976 | A1 * | 9/2005 | Hakamada | 358/509 |

FOREIGN PATENT DOCUMENTS

| | | |
|---|---|---|
| JP | 01-130462 | 5/1989 |
| JP | 05-227374 | 9/1993 |
| JP | 08-007839 | 1/1996 |
| JP | 11-098331 | 4/1999 |
| JP | 2001-238049 | 8/2001 |
| JP | 2003-075944 | 3/2003 |
| JP | 2005-065198 | 3/2005 |

\* cited by examiner

*Primary Examiner*—Cheukfan Lee
(74) *Attorney, Agent, or Firm*—Workman Nydegger

(57) ABSTRACT

An image scanning apparatus includes: a reflective document lamp that emits light to the surface of a reflective document; a carriage that has the reflective document lamp and an image sensor for detecting light and converting the detected light into an electric signal mounted thereon and reciprocates in a sub-scanning direction; an indicator lamp that emits light and indicates the state of the apparatus; a determining unit that determines whether the reflective document lamp is turned on by using the image sensor; and a control unit that controls the on or off state of the reflective document lamp, the on or off state of the indicator lamp, and the movement of the carriage. In the image scanning apparatus, when the determining unit determines that the reflective document lamp is not turned on, the control unit moves the carriage to a predetermined position such that the indicator lamp emits light to the reflective document lamp.

8 Claims, 6 Drawing Sheets

IMAGE SCANNING APPARATUS AND METHOD OF CONTROLLING THE SAME

BACKGROUND

1. Technical Field

The present invention relates to an image scanning apparatus and a method of controlling the same.

2. Related Art

Image scanning apparatuses that include a reflective document lamp and scan reflective documents, such as documents and photographs, have been proposed. In many cases, a cold cathode fluorescent lamp (hereinafter, referred to as a CCFL) is used as the reflective document lamp. However, when the CCFL is left for a long time in a dark environment in which light is shielded, the number of initial electrons contributing to discharge required for the lighting of the CCFL in a lamp tube is reduced. As a result, the starting time from the application of a voltage to the lighting of the lamp is lengthened, that is, 'a starting performance in a dark environment' is lowered.

In order to solve the above-mentioned problem, JP-A-1-130462 discloses a method of using an auxiliary light source. In the method disclosed in JP-A-1-130462, an auxiliary light source, such as a candescent lamp or a light emitting diode, is provided, and light from the auxiliary lamp is emitted to a discharge lamp when the discharge lamp starts to increase the number of initial electrons of the lamp, thereby shortening the starting time of the lamp.

However, in the method of using the auxiliary light source, it is necessary to provide an additional auxiliary light source for illuminating the discharge lamp, which results in an increase in the manufacturing costs of the apparatus.

SUMMARY

An advantage of some aspects of the invention is that it provides an image scanning apparatus and a method of controlling the same capable of turning on a lamp having a low starting performance in a dark environment without increasing manufacturing costs.

According to an aspect of the invention, an image scanning apparatus includes: a reflective document lamp that emits light to the surface of a reflective document; a carriage that has the reflective document lamp and an image sensor for detecting light and converting the detected light into an electric signal mounted thereon and reciprocates in a sub-scanning direction; an indicator lamp that emits light and indicates the state of the apparatus; a determining unit that determines whether the reflective document lamp is turned on by using the image sensor; and a control unit that controls the on or off state of the reflective document lamp, the on or off state of the indicator lamp, and the movement of the carriage. In the image scanning apparatus, when the determining unit determines that the reflective document lamp is not turned on, the control unit moves the carriage to a predetermined position such that the indicator lamp emits light to the reflective document lamp.

According to the above-mentioned structure, the determining unit determines whether the reflective document lamp is turned on by using the image sensor. When it is determined that the reflective document lamp is not turned on, the control unit moves the carriage to a predetermined position such that the indicator lamp emits light to the reflective document lamp. Since the indicator lamp emits light to the reflective document lamp, the number of initial electrons contributing to discharge required to the lighting of the lamp in a lamp tube increases, which makes it possible to turn on the reflective document lamp having a low starting performance in a dark environment. In addition, since the indicator lamp that is provided in a general image scanning apparatus to indicate the state of the apparatus also serves as an auxiliary light source for illuminating the reflective document lamp, it is not necessary to additionally provide an auxiliary light source, resulting in a reduction in manufacturing costs, and it is possible to turn on a lamp having a low starting performance in a dark environment.

In the image scanning apparatus according to the above-mentioned aspect, preferably, when a power supply is turned on, the control unit moves the carriage to a white reference scanning position, and the determining unit determines whether the reflective document lamp is turned on at the white reference scanning position.

In the image scanning apparatus according to the above-mentioned aspect, preferably, the white reference scanning position is a home position of the carriage.

In the image scanning apparatus according to the above-mentioned aspect, preferably, the determining unit determines whether the reflective document lamp is turned on, with light from the indicator lamp being emitted to the reflective document lamp.

In the image scanning apparatus according to the above-mentioned aspect, preferably, when the determining unit determines that the reflective document lamp is not turned on, the control unit moves the carriage to the white reference scanning position, and the determining unit determines whether the reflective document lamp is turned on at the white reference scanning position.

In the image scanning apparatus according to the above-mentioned aspect, preferably, the indicator lamp is a light emitting diode.

According to another aspect of the invention, there is provided a method of controlling an image scanning apparatus. The method includes: determining whether a reflective document lamp, serving as a light source for emitting light to the surface of a reflective document, is turned on, by using an image sensor that detects light and converts the detected light into an electric signal; and controlling the on or off state of the reflective document lamp, the on or off state of an indicator lamp that emits light and indicates the state of the apparatus, and the movement of a carriage that has the reflective document lamp and the image sensor mounted thereon and reciprocates in a sub-scanning direction. In the control method, when it is determined that the reflective document lamp is not turned on, the controlling of the reflective document lamp, the indicator lamp, and the carriage includes: moving the carriage to a predetermined position; and controlling the indicator lamp to emit light to the reflective document lamp.

BRIEF DESCRIPTION OF THE DRAWINGS

The invention will be described with reference to the accompanying drawings, wherein like numbers refer like elements.

DESCRIPTION OF EXEMPLARY EMBODIMENTS

Hereinafter, an image scanning apparatus according to an embodiment of the invention will be described with reference to the accompanying drawings.

Schematic Structure of Image Scanner

First, the schematic structure of an image scanning apparatus according to an embodiment of the invention will be described with reference to FIGS. 1 and 2.

Figure 1:
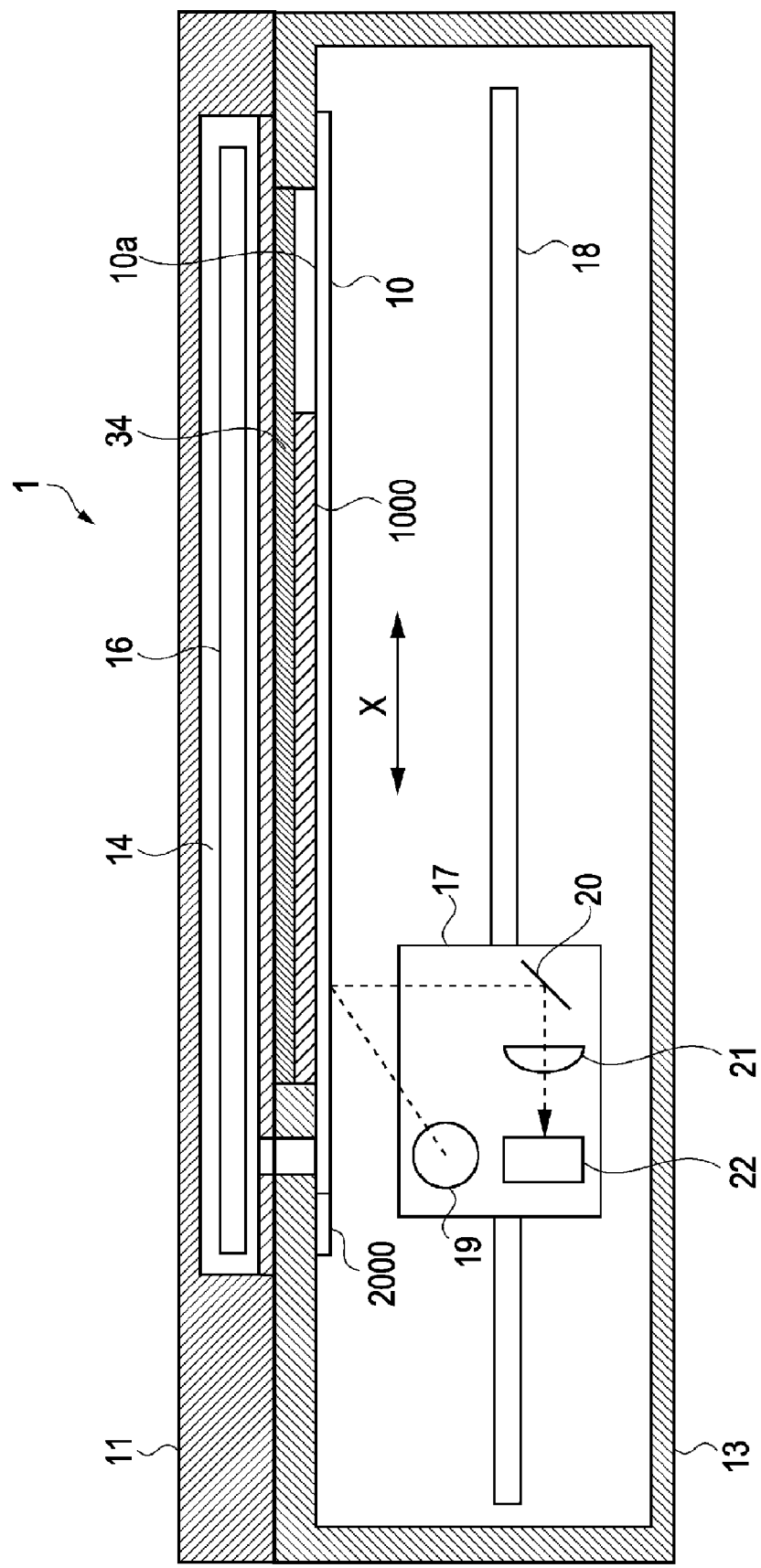
FIG. 1 is a diagram schematically illustrating the internal structure of an image scanner, serving as an image scanning apparatus according to an embodiment of the invention, as viewed from the front side.

FIG. 1 is a diagram schematically illustrating the internal structure of an image scanner, serving as the image scanning apparatus according to the embodiment of the invention, as viewed from the front side. FIG. 2 is a diagram schematically illustrating the internal structure of the image scanner according to the embodiment of the invention, as viewed from the side. In this embodiment, a flatbed image scanner 1 for scanning a document 1000 loaded on a platen 10 is given as an example. The document 1000 may be a reflective document, such as a document, a photograph, or a book, or a transmissive document, such as a 35 mm strip film, a 35 mm mount film, or a Brownie film.

The image scanner 1 includes a document cover 11 and a housing 13 having the platen 10 for loading the document 1000 therein. The document cover 11 is connected to the housing 13 by a hinge 12 shown in FIG. 2 such that it exposes or covers a document loading surface 10a of the platen 10. In FIGS. 1 and 2, the document cover 11 covers the document loading surface 10a.

A white reference plate 2000 that is used for image correction (shading correction) is provided in the housing 13. The position of the white reference plate 2000 is not particularly limited, but in this embodiment, the white reference plate 2000 is provided at one end of the platen 10.

Further, a guide rod 18 that is parallel to the document loading surface 10a and a carriage 17 that is slidably fitted to the guide rod 18 are provided in the housing 13. The carriage 17 is provided with a reflective document lamp 19, a mirror 20, a lens 21, and an image sensor 22. The carriage 17 is moved by a belt (not shown) wound around pulleys (not shown) that are driven by a carriage transporting motor 102 (see FIG. 3) to reciprocate in an X direction (sub-scanning direction) that is parallel to the document loading surface 10a.

The reflective document lamp 19 is a CCFL. The mirror 20 and the lens 21 make light that is emitted from the reflective document lamp 19 and then reflected from the reflective document and light that is emitted from the transmissive document lamp 16 and passes through the transmissive document incident on a light receiving surface of the image sensor 22. When the reflective document lamp 19, the mirror 20, the lens 21, and the image sensor 22 are carried by the carriage 17 in the X direction, the main scanning line on the document 1000 is moved.

The image sensor 22 converts the received light into an electric signal (image signal), and outputs the converted image signal to an analog front end (hereinafter, referred to as an AFE) 107 (see FIG. 3). For example, a linear image sensor in which a plurality of cells (not shown), each composed of, for example, a photodiode, are arranged in a line may be used as the image sensor 22. The image sensor 22 is mounted on the carriage 17 with the plurality of cells being aligned in parallel to a central axis of the tubal reflective document lamp 19. Charge corresponding to the received light is stored in each cell of the image sensor 22 by photo-electric conversion. The charge stored in each pixel is transmitted to an output unit of the image sensor 22 by a CCD (charge coupled device). The transmission of charge may be performed by a CMOS (complementary metal oxide semiconductor).

A surface light source 14 is provided in the document cover 11. The surface light source 14 includes the transmissive document lamp 16 and a diffusing plate (not shown). The transmissive document lamp 16 is a CCFL, and is arranged such that the longitudinal direction thereof is parallel to the central axis of the guide rod 18. The surface light source 14 illuminates the transmissive document with uniform luminance. In addition, the surface light source 14 is covered with a white document mat when scanning a reflective document.

Figure 2:
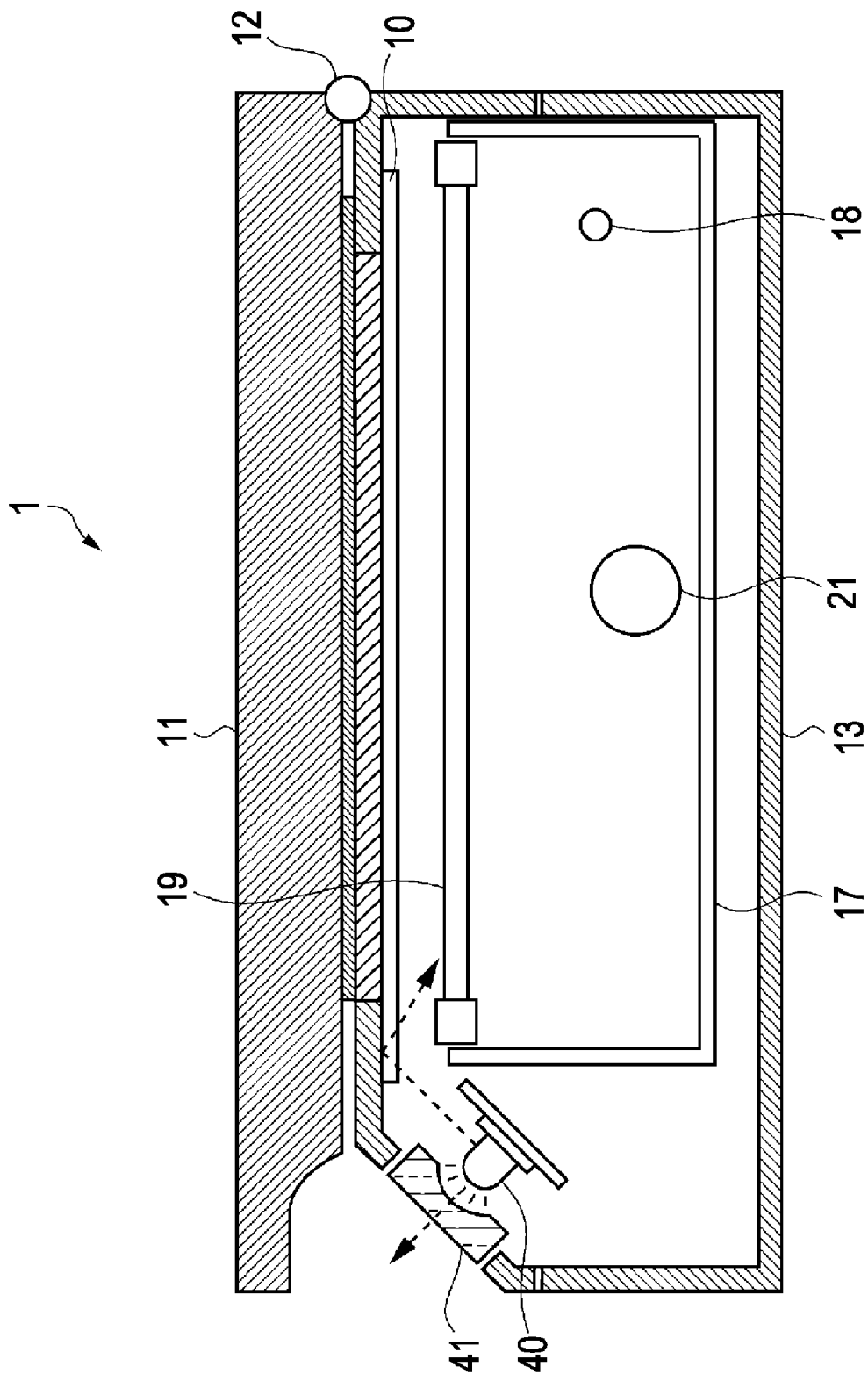
FIG. 2 is a diagram schematically illustrating the internal structure of the image scanner according to the embodiment of the invention, as viewed from the side.

As shown in FIG. 2, a light emitting diode (hereinafter, referred to as an LED) 40, serving as an indicator lamp, is provided in front of the housing 13. The LED 40 is turned on, and light is emitted to the outside through an indicator lens 41 to indicate whether the image scanner 1 is in, for example, a warm-up state, a standby state, or an error state to the user. In addition, the LED 40 also serves as an auxiliary light source for illuminating the reflective document lamp 19 having a low starting performance in a dark environment.

In this embodiment, two red and green LEDs are provided, and the two LEDs are all turned on to illuminate the reflective document lamp 19. However, the number and colors of LEDs provided in the housing 13 are not limited thereto, and the LEDs for illuminating the reflective document lamp 19 are not limited to the above.

Hardware Structure of Image Scanner

Next, the hardware structure of the image scanner 1 will be described below.

Figure 3:
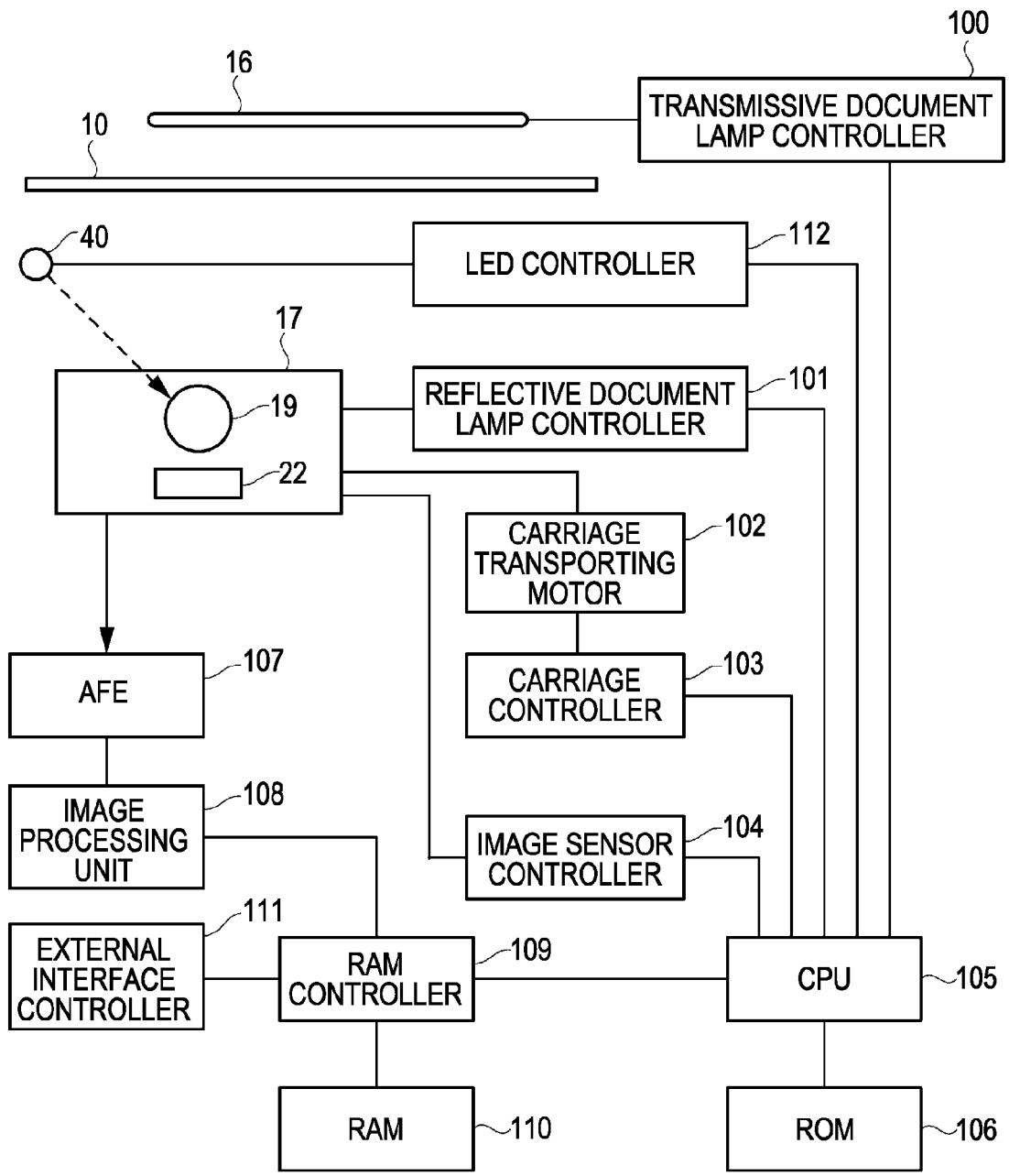
FIG. 3 is a block diagram illustrating the main hardware components of the image scanner according to the embodiment of the invention.

FIG. 3 is a block diagram illustrating the main hardware components of the image scanner according to this embodiment. As shown in FIG. 3, the image scanner 1 includes a transmissive document lamp controller 100, a reflective document lamp controller 101, a carriage transporting motor 102, a carriage controller 103, an image sensor controller 104, an LED controller 112, a CPU (central processing unit) 105, a ROM (read only memory) 106, an AFE (analog front end) 107, an image processing unit 108, a RAM (random access memory) controller 109, a RAM 110, and an external interface controller 111.

The CPU 105 loads various programs stored in the ROM 106 to the RAM 110 to execute the programs. Therefore, the CPU 105 serves as a control unit for controlling the overall operation of the image scanner 1.

The RAM controller 109 controls data transmission among the CPU 105, the RAM 110, the image processing unit 108, and the external interface controller 111.

The transmissive document lamp controller 100 controls the on or off state of the transmissive document lamp 16. Specifically, the transmissive document lamp controller 100 includes an inverter circuit and a control circuit (not shown), and turns on or off the transmissive document lamp 16 according to instructions from the CPU 105.

The reflective document lamp controller 101 controls the on or off state of the reflective document lamp 19. Specifically, the reflective document lamp controller 101 includes an inverter circuit and a control circuit (not shown) to control the on or off state of the reflective document lamp 19 according to instructions from the CPU 105.

The image sensor controller 104 controls the driving of the image sensor 22 according to instructions from the CPU 105. Specifically, the image sensor controller 104 is a driving circuit that outputs a driving pulse required to drive the image sensor 22 to the image sensor 22. The image sensor controller 104 includes, for example, a synchronization signal generator and a driving timing generator.

The carriage controller 103 controls the driving of the carriage transporting motor 102 according to instructions from the CPU 105 to reciprocate the carriage 17. Specifically, the carriage controller 103 includes a carriage transporting motor driving circuit and a control circuit. The carriage controller 103 controls the rotating direction and rotational speed of the carriage transporting motor 102 in response to control signals from the CPU 105.

The LED controller 112 controls the LED 40 to be turned on or off, or to be repeatedly turned on and off. Specifically, the LED controller 112 includes an inverter circuit and a control circuit (not shown), and controls the LED 40 to be turned on or off or to be blinked according to instructions from the CPU 105.

The AFE 107 receives image information from the image sensor 22. The AFE 107 performs, for example, a CDS (correlated double sampling) process, an optical black clamping control process for reproducing the grayscale level of an image, an electric signal level adjusting process for adjusting the gain of an electric signal of an image, and a quantizing process on the received image information to obtain digital image information (scan image), and outputs the digital image information to the image processing unit 108.

The image processing unit 108 is a DSP (digital signal processor) that performs image processing on the image information received from the AFE 107. Specifically, the image processing unit 108 performs image processing, such as gamma correction and shading correction, on the image information received from the AFE 107 in cooperation with the CPU 105.

The external interface controller 111 controls data transmission between the image scanner 1 and an external apparatus (for example, a PC connected to the image scanner 1).

Operation of Auxiliary Lighting Process

Next, an auxiliary lighting process in which the LED 40 assists the lighting of the reflective document lamp 19 will be described below.

Figure 6:
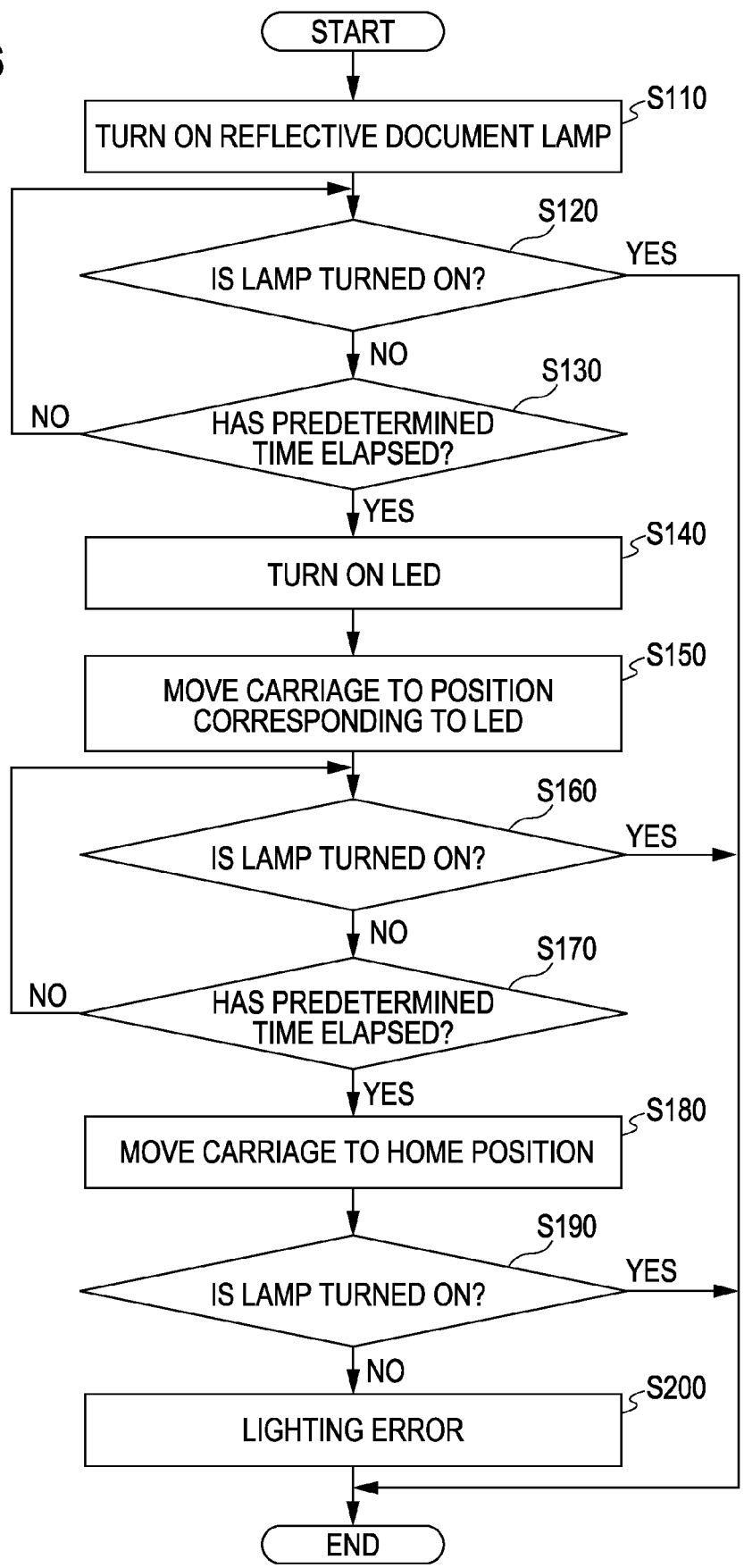
FIG. 6 is a flow chart illustrating an auxiliary lighting process of a reflective document lamp.

FIG. 6 is a flow chart illustrating the auxiliary lighting process of the reflective document lamp. In this embodiment, the CPU 105 starts the procedure of the flow chart when the image scanner 1 is turned on.

Figure 4:
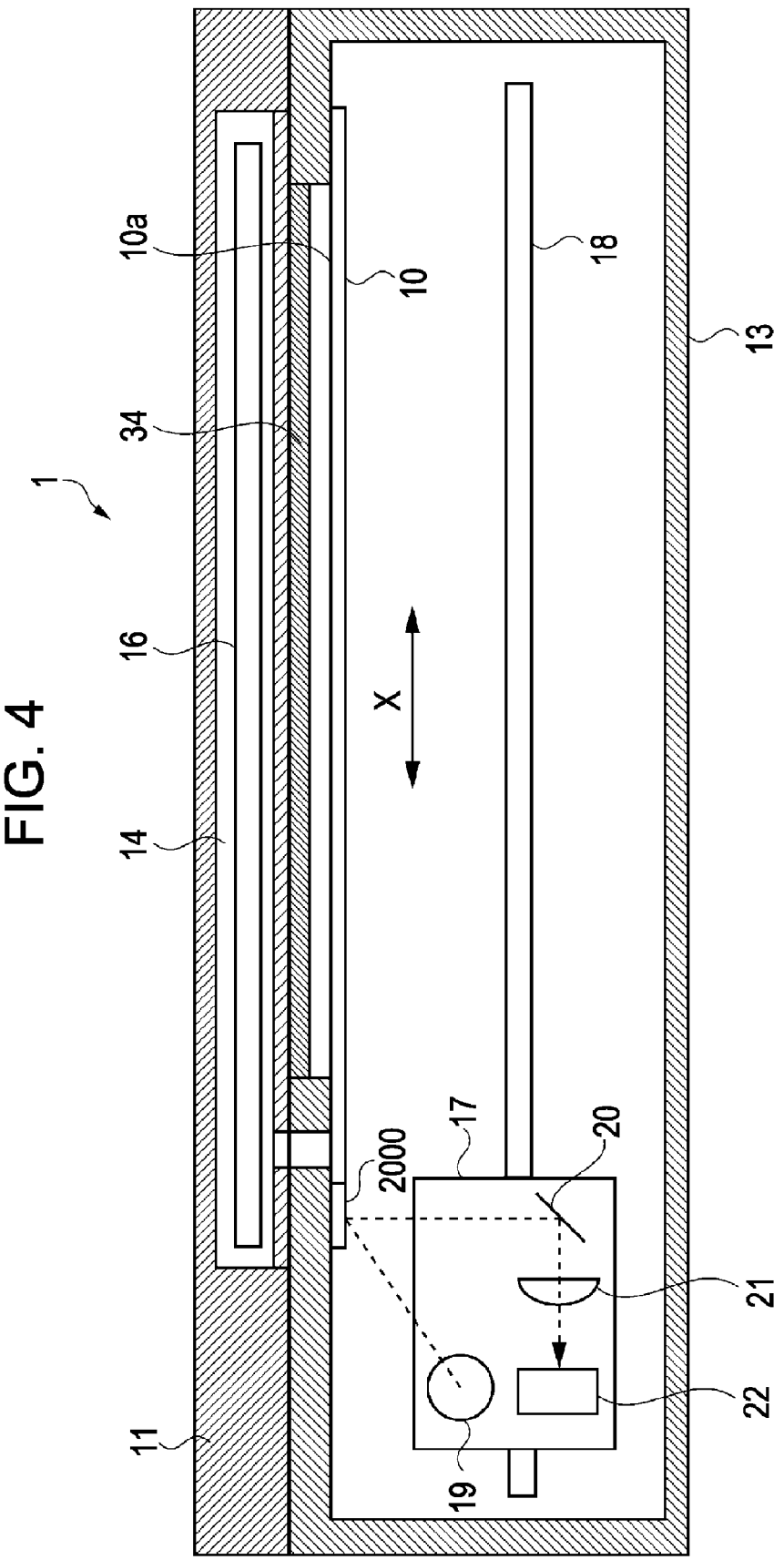
FIG. 4 is a diagram schematically illustrating the internal structure of the image scanner when a carriage is disposed at a home position.

When the image scanner 1 is turned on, the CPU 105 disposes the carriage 17 at a home position. FIG. 4 is a diagram schematically illustrating the internal structure of the image scanner when the carriage is disposed at the home position. As shown in FIG. 4, when the carriage 17 is disposed at the home position, light emitted from the reflective document lamp 19 is reflected from the white reference plate 2000, and the reflected light is incident on the light receiving surface of the image sensor 22, so that the light is detected. That is, the home position of the carriage 17 is set to a white reference scanning position where the image sensor 22 can detect light reflected from the white reference plate 2000.

First, in Step S110, the CPU 105 turns on a switch for the reflective document lamp 19 to apply a predetermined voltage to the reflective document lamp 19, thereby turning on the reflective document lamp 19.

In this case, when the reflective document lamp 19 is kept in a dark environment for a long time, the reflective document lamp 19 may not be turned on even when a predetermined voltage is applied.

In Step S120, the CPU 105 determines whether the reflective document lamp 19 is turned on after the switch is turned on in Step S110.

When it is determined that the reflective document lamp 19 is turned on, the auxiliary light process shown in the flow chart ends.

Meanwhile, when it is determined that the reflective document lamp 19 is not turned on, the process proceeds to Step S130 to determine whether a predetermined time (in this embodiment, five seconds or more after the carriage 17 is disposed at the home position) has elapsed. When it is determined that the predetermined time has not elapsed, it is determined in Step S120 whether the reflective document lamp 19 is turned on again. When it is determined that the predetermined time has elapsed, the process proceeds to Step S140 since the lamp is not turned on after the predetermined time.

In this case, it is determined whether the reflective document lamp 19 is turned on, according to whether the image sensor 22 detects light reflected from the white reference plate 2000. Specifically, the image sensor 22 converts the detected light into an electric signal, and outputs the converted electric signal to the AFE 107. The CPU 105 determines that the lamp is turned on when data acquired from the AFE 107 is equal to or greater than a predetermined value, and determines that the light is not turned on when the data is smaller than the predetermined value.

In Step S140, the CPU 105 turns on the LED 40. The LED 40 is immediately turned on since the starting time thereof is not lengthened even when it is kept in a dark environment for a long time.

In Step S150, the CPU 105 controls the carriage 17 to move to a position corresponding to the LED 40. In this way, one end of the reflective document lamp 19 mounted on the carriage 17 is illuminated by the LED 40. Alternatively, Step S140 and Step S150 may be reversely performed. That is, in Step S150, the carriage 17 may move to a position corresponding to the LED 40, and in Step S140, the LED 40 may be turned on.

Figure 5:
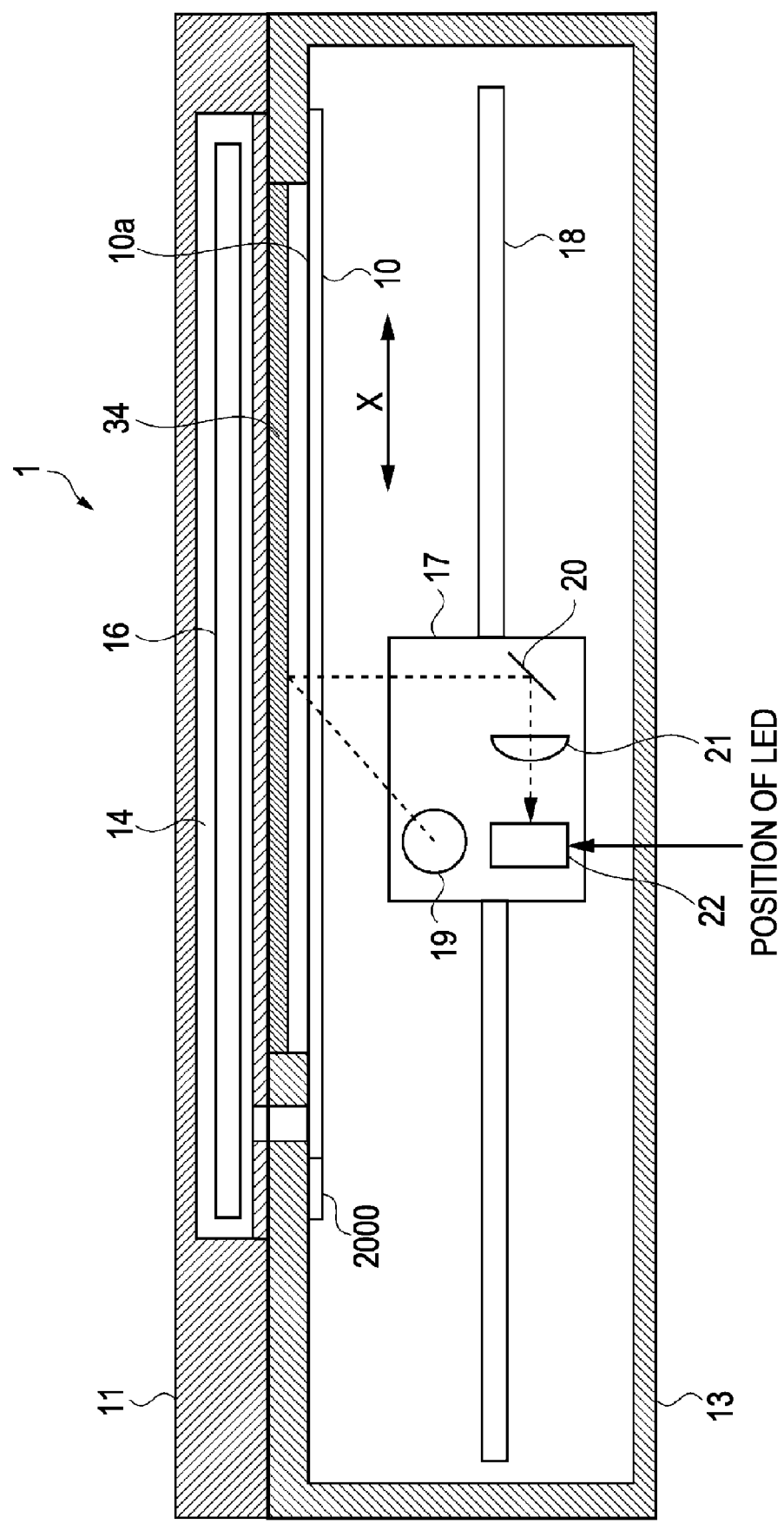
FIG. 5 is a diagram schematically illustrating the internal structure of the image scanner when the carriage is disposed at a position corresponding to an LED.

FIG. 5 is a diagram schematically illustrating the internal structure of the image scanner when the carriage is disposed at a position corresponding to the LED. As shown FIG. 5, the carriage 17 moves such that the reflective document lamp 19 and the LED 40 are aligned with each other in the X direction. FIG. 2 shows an optical path in which, when the carriage 17 is disposed at a position corresponding to the LED 40, light emitted from the LED 40 is incident on one end of the reflective document lamp 19. As shown in FIG. 2, light emitted from the LED 40 is reflected from the inner wall of an upper part of the housing 13 to one end of the reflective document lamp 19.

In Step S160, the CPU 105 determines whether the reflective document lamp 19 in an off state is turned on.

When it is determined that the reflective document lamp 19 is turned on, the auxiliary lighting process of the flow chart ends.

On the other hand, when it is determined that the reflective document lamp 19 is in an off state, the process proceeds to Step S170 to determine whether a predetermined time (in this embodiment, 60 seconds or more after the carriage 17 is disposed at the home position) has elapsed. As the result of the determination, when the predetermined time has not elapsed, the process in Step S160 is repeated to determine whether the reflective document lamp 19 is turned on. When the predetermined time has elapsed, the CPU 105 determines that the reflective document lamp 19 is not turned on even though the auxiliary lighting process by the LED 40 is performed, and then the process proceeds to Step S180.

In this case, it is determined whether the reflective document lamp 19 is turned on, according to whether the image sensor 22 detects light reflected from the inside of a case, which is out of the general scanning range of the scanner. The reason is to stably perform the determination regardless of the closing or opening of the document cover 11 or the color of a loaded document.

In Step S180, the CPU 105 moves the carriage 17 to the home position, which is an initial position. In this way, the image sensor 22 is moved to a position capable of detecting light reflected from the white reference plate 2000.

In Step S190, the CPU 105 determines whether the reflective document lamp 19 is turned on at the home position that is moved in Step S180.

When it is determined that the reflective document lamp 19 is turned on, the auxiliary lighting process of the flow chart ends.

On the other hand, when it is determined that the reflective document lamp 19 is not turned on, the process proceeds to Step S200 to notify the user that a lighting error occurs in the reflective document lamp 19.

In this case, it is determined whether the reflective document lamp 19 is turned on, according to whether the image sensor 22 detects light reflected from the white reference plate 2000.

The determining process according to this embodiment corresponds to Steps S120, S160, and S190.

The control process according to this embodiment corresponds to Steps S110, S140, S150, and S180.

As described above, in the image scanner 1 according to this embodiment, even when a power supply is turned on and a switch for the reflective document lamp 19 is turned on, the reflective document lamp 19 may not be turned on. In this case, the LED 40 is turned on, and the carriage 17 is moved to a position corresponding to the LED 40. In this way, one end of the reflective document lamp 19 mounted on the carriage 17 is illuminated by the LED 40. The light emitted from the LED 40 makes it possible to increase the amount of initial electrons contributing to discharge required to the lighting of the reflective document lamp 19 and thus to turn on the reflective document lamp 19 having a low starting performance in a dark environment. That is, for example, when the reflective document lamp 19 is kept in a dark environment for a long time, it is possible to prevent the starting performance of the image scanner 1 in a dark environment from being lowered by using light emitted from the LED 40.

Since the starting performance of the LED 40 is not affected by the dark environment, the LED 40 is immediately turned on to illuminate the reflective document lamp 19 even when the image scanner 1 is left in a dark environment for a long time, which makes it possible to reliably prevent the starting performance of the reflective document lamp 19 in the dark environment from being lowered.

The LED 40 serves as an indicator lamp that indicates the state of the image scanner 1 to the user, and is provided in a general image scanner. Since the LED 40 also serves as an auxiliary light source for illuminating the reflective document lamp 19 having a low starting performance in a dark environment, it is possible to reduce manufacturing costs of an image scanner, and prevent the starting performance in a dark environment from being lowered.

Further, when the power supply is turned on, the carriage having the reflective document lamp 19 mounted thereon is moved to a position where the image sensor 22 can detect light reflected from the white reference plate 2000 to determine whether the reflective document lamp 19 is turned on. In this way, it is possible to accurately determine whether the reflective document lamp 19 is turned on.

Furthermore, the carriage 17 is moved such that the reflective document lamp 19 is illuminated by the LED 40. In this state, it is determined whether the reflective document lamp 19 is turned on. Therefore, when the reflective document lamp 19 is illuminated by the LED 40, it is possible to immediately determine whether the reflective document lamp 19 is turned on, and thus to shorten the time required for the determination.

Further, it is determined whether the reflective document lamp 19 is turned on, with the reflective document lamp 19 being illuminated by the LED 40. As the result of the determination, when the reflective document lamp 19 is not turned on after a predetermined time has elapsed, the carriage 17 is returned to the home position, and it is determined whether the reflective document lamp 19 is turned on according to whether light reflected from the white reference plate 2000 is detected. In this way, it is possible to accurately determine whether the reflective document lamp 19 is turned on.

First Modification

In the above-described embodiment, the image scanner is given as an example of the image scanning apparatus, but the invention is not limited to the image scanner. For example, a duplicating machine or a multifunction machine having an image scanning function may be used as the image scanning apparatus. Particularly, in the case of the multifunction machine, in many cases, since the document cover is closed for a long time, the reflective document lamp is more likely to be kept in a dark environment for a long time. Therefore, a method of preventing a starting performance in a dark environment from being lowered according to the invention is more effective for the multifunction machine.

Second Modification

In the above-described embodiment, the LED is used as the indicator lamp serving as an auxiliary lamp, but the invention is not limited thereto. For example, an incandescent lamp may be used as the auxiliary lamp.

Third Modification

In the above-described embodiment, when a power supply is turned on, the processes shown in the flow chart of FIG. 6 are performed, but the invention is not limited thereto. For example, only when the user inputs an instruction to perform the auxiliary lighting process, the processes shown in the flow chart of FIG. 6 may be performed. Alternatively, when the user inputs an instruction to scan a reflective document, the processes shown in the flow chart of FIG. 6 may be performed.

The entire disclosure of Japanese Patent Application No. 2006-249411, filed Sep. 14, 2006 is expressly incorporated by reference herein.

What is claimed is:

1. An image scanning apparatus comprising:
   a reflective document lamp that emits light to the surface of a reflective document;
   a carriage that has the reflective document lamp and an image sensor for detecting light and converting the detected light into an electric signal mounted thereon and reciprocates in a sub-scanning direction;
   an indicator lamp that emits light and indicates the state of the apparatus;

a determining unit that determines whether the reflective document lamp is turned on by using the image sensor; and a control unit that controls the on or off state of the reflective document lamp, the on or off state of the indicator lamp, and the movement of the carriage, wherein, when the determining unit determines that the reflective document lamp is not turned on, the control unit moves the carriage to a predetermined position such that the indicator lamp emits light to the reflective document lamp.

2. The image scanning apparatus according to claim 1, wherein, when a power supply is turned on, the control unit moves the carriage to a white reference scanning position, and the determining unit determines whether the reflective document lamp is turned on at the white reference scanning position.

3. The image scanning apparatus according to claim 2, wherein the white reference scanning position is a home position of the carriage.

4. The image scanning apparatus according to claim 1, wherein the determining unit determines whether the reflective document lamp is turned on, with light from the indicator lamp being emitted to the reflective document lamp.

5. The image scanning apparatus according to claim 4, wherein, when the determining unit determines that the reflective document lamp is not turned on, the control unit moves the carriage to the white reference scanning position, and the determining unit determines whether the reflective document lamp is turned on at the white reference scanning position.

6. The image scanning apparatus according to claim 5, wherein the indicator lamp is a light emitting diode.

7. The image scanning apparatus according to claim 1, wherein the indicator lamp is a light emitting diode.

8. A method of controlling an image scanning apparatus, comprising:

determining whether a reflective document lamp, serving as a light source for emitting light to the surface of a reflective document, is turned on, by using an image sensor that detects light and converts the detected light into an electric signal; and controlling the on or off state of the reflective document lamp, the on or off state of an indicator lamp that emits light and indicates the state of the apparatus, and the movement of a carriage that has the reflective document lamp and the image sensor mounted thereon and reciprocates in a sub-scanning direction, wherein, when it is determined that the reflective document lamp is not turned on, the controlling of the reflective document lamp, the indicator lamp, and the carriage includes:

moving the carriage to a predetermined position; and controlling the indicator lamp to emit light to the reflective document lamp.

* * * * *